United States Patent
Natsuno et al.

(10) Patent No.: US 8,107,925 B2
(45) Date of Patent: Jan. 31, 2012

(54) PORTABLE BASE STATION DEVICE

(75) Inventors: Takeshi Natsuno, Tokyo (JP); Izua Kano, Yokohama (JP); Kazuhiro Yamada, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 477 days.

(21) Appl. No.: 12/294,070

(22) PCT Filed: Mar. 23, 2007

(86) PCT No.: PCT/JP2007/055982
§ 371 (c)(1),
(2), (4) Date: Jan. 16, 2009

(87) PCT Pub. No.: WO2007/111239
PCT Pub. Date: Oct. 4, 2007

(65) Prior Publication Data
US 2009/0131019 A1    May 21, 2009

(30) Foreign Application Priority Data
Mar. 24, 2006 (JP) .................................. 2006-083653

(51) Int. Cl.
*H04M 3/16* (2006.01)
(52) U.S. Cl. .......................... 455/411; 455/410; 455/423
(58) Field of Classification Search .................. 455/411, 455/419, 420, 425, 11.1, 575.1, 343.3, 354, 455/410, 423, 424
See application file for complete search history.

(56) References Cited

U.S. PATENT DOCUMENTS

| | | | | | |
|---|---|---|---|---|---|
| 3,551,906 | A | * | 12/1970 | Cooper | 340/539.11 |
| 4,023,139 | A | * | 5/1977 | Samburg | 340/506 |
| 4,099,169 | A | * | 7/1978 | Donnelly | 340/304 |
| 4,782,321 | A | * | 11/1988 | Colvin | 340/426.31 |

(Continued)

FOREIGN PATENT DOCUMENTS

CN    1430834    7/2003

(Continued)

OTHER PUBLICATIONS

Joe Grand, et al., "Protecting Your Crown Jewels: an Introduction to Embedded Security for Hardware-Based Products", Computer Fraud and Security, XP005130749, vol. 2005, No. 10, Oct. 1, 2005, pp. 13-20.

(Continued)

*Primary Examiner* — Kent Chang
*Assistant Examiner* — Magdi Elhag
(74) *Attorney, Agent, or Firm* — Oblon, Spivak, McClelland, Maier & Neustadt, L.L.P.

(57) ABSTRACT

This invention provides a mobile base station device which allows tamper resistance to be adequately secured even when the housing is opened illicitly. In a mobile base station device 1, when a housing 2 is opened illicitly, a user ID or similar is transmitted to a service management server 20, and the user attempting an illicit operation is identified. By registering the identified user on a blacklist, subsequent use of the mobile base station device 1 by this user can be prohibited. Also, in the mobile base station device 1, together with transmission of the user ID, a communication control program 7 is deleted from a communication control module 6, so that the interior of the housing 2 is rendered a "black box", and modification and illicit use of the communication control program can be deterred. As a result, even when the housing 2 of the mobile base station device 1 is opened illicitly, tamper resistance can be adequately secured.

1 Claim, 5 Drawing Sheets

U.S. PATENT DOCUMENTS

| | | | |
|---|---|---|---|
| 5,945,915 A | 8/1999 | Cromer et al. | |
| 6,420,970 B1 * | 7/2002 | Kampmann et al. | 340/541 |
| 7,117,015 B2 * | 10/2006 | Scheinert et al. | 455/561 |
| 7,222,779 B1 * | 5/2007 | Pineda-Sanchez et al. | 232/36 |
| 7,274,293 B2 * | 9/2007 | Bradus et al. | 340/568.2 |
| 7,612,678 B1 * | 11/2009 | Potter et al. | 340/572.8 |
| 2003/0189481 A1 * | 10/2003 | Hamid | 340/5.53 |
| 2007/0046423 A1 * | 3/2007 | Baucom | 340/5.5 |
| 2008/0055040 A1 * | 3/2008 | Lizza et al. | 340/5.7 |

FOREIGN PATENT DOCUMENTS

| | | |
|---|---|---|
| EP | 1 580 923 A1 | 9/2005 |
| JP | 6 311099 | 11/1994 |
| JP | 9 34365 | 2/1997 |

OTHER PUBLICATIONS

Chinese Office Action issued Jul. 12, 2011, in Patent Application No. 200780010578.3 (with English-language translation).

* cited by examiner

Fig.3

| BASE STATION ID | 0000AA |
|---|---|
| USER ID | 0000BB |
| TIME INFORMATION | 20XX/XX/XX |

PORTABLE BASE STATION DEVICE

TECHNICAL FIELD

This invention relates to a mobile base station device, installed primarily within a home, for relaying communication between a portable terminal and a network.

BACKGROUND ART

With the spread of portable terminals in recent years, development of mobile base station devices which can easily be installed as access points for portable terminals has been conducted (see for example Patent Reference 1). If mobile base station devices come into widespread use in homes and various other locations, the area of communication of portable terminals will be broadened, and in addition, in future it can be expected that such devices will function to provide home services connecting household appliances within the home.

In such mobile base station devices, a module storing a communication control program is provided within a housing. Hence when promoting widespread use of such devices, it is essential that unauthorized modification and illicit use of the communication control program by users be deterred, and that technology to improve tamper resistance be employed. As such technology, for example, the housing seal device described in Patent Reference 2 may be used. When using such a housing seal device of the prior art, the illicit opening of the housing is indicated by an LED lighting pattern.
Patent Reference 1: Japanese Patent Laid-open No. 6-311099
Patent Reference 2: Japanese Patent Laid-open No. 9-34365

DISCLOSURE OF THE INVENTION

Problems to be Solved by the Invention

However, when using the above-described housing seal device of the prior art, it is only possible to easily confirm from outside the illicit opening of the housing, but when illicit opening occurs, preservation as a "black box" to prevent modification from outside of the housing interior is not possible. Hence, in light of the fact that the installation location of mobile base station devices is primarily within homes, even if housing seal devices of the prior art are applied as-is to mobile base station devices, unauthorized modification and illicit use of the communication control program by users cannot be deterred, and enhancement of the tamper resistance of the device is difficult.

This invention was devised in light of the above problem, and has as an object the provision of a mobile base station device which allows tamper resistance to be adequately secured even when there has been illicit opening of the housing.

Means for Solving the Problem

In order to resolve the above problem, a mobile base station device of this invention which comprises a housing in which is housed a module which stores a communication control program, further comprises information transmission means for transmitting user-specific information for identifying a user of the device to a prescribed transmission destination when the housing is opened, and use-disabling means for placing the communication control program in a use-disabled state when user-specific information is transmitted to the prescribed transmission destination by the information transmission means.

In this mobile base station device, when the housing is illicitly opened, user-specific information for the device is transmitted to a prescribed transmission destination. By this means, the user attempting an illicit operation can be identified at the prescribed transmission destination, and so this user can for example be registered on a blacklist, and subsequent use of the mobile base station device by the user can be prohibited. Also, together with transmission of user-specific information, the communication control program of this mobile base station device is rendered unusable, so that interior of the housing is rendered a "black box", and modification and illicit use of the communication control program can be deterred. As a result of these actions, even when the housing of the mobile base station device is opened, tamper resistance can be adequately secured.

Also, it is preferable that opening detection means for detecting opening of the housing be further provided, and that when opening of the housing is detected by the opening detection means, the information transmission means transmit user-specific information to the prescribed transmission destination, and that when user-specific information has been transmitted to the prescribed transmission destination by the information transmission means, the program use-disabling means executes deletion of the communication control program. In this case, by means of the opening detection means, illicit opening of the housing can be reliably detected. Further, by deleting the communication control program, modification and illicit use of the program can be reliably deterred.

Also, it is preferable that switching request reception means for receiving mode switching request information to request switching the program use-disabling means to a maintenance mode be further provided, and that when the switching request reception means receives mode switching request information, the program use-disabling means not execute deletion of the communication control program even when opening of the housing is detected by the opening detection means. In this case, opening of the housing can be allowed in defined cases, such as when performing repairs on the mobile base station device.

EFFECTS OF THE INVENTION

As explained above, by means of a mobile base station device of this invention, resistance tampering can be adequately secured even when illicit opening of the housing occurs.

BRIEF DESCRIPTION OF THE DRAWINGS

FIG. 3 shows an example of information stored in a UIM for a base station device.

EXPLANATION OF REFERENCE NUMERALS

Figure 1:
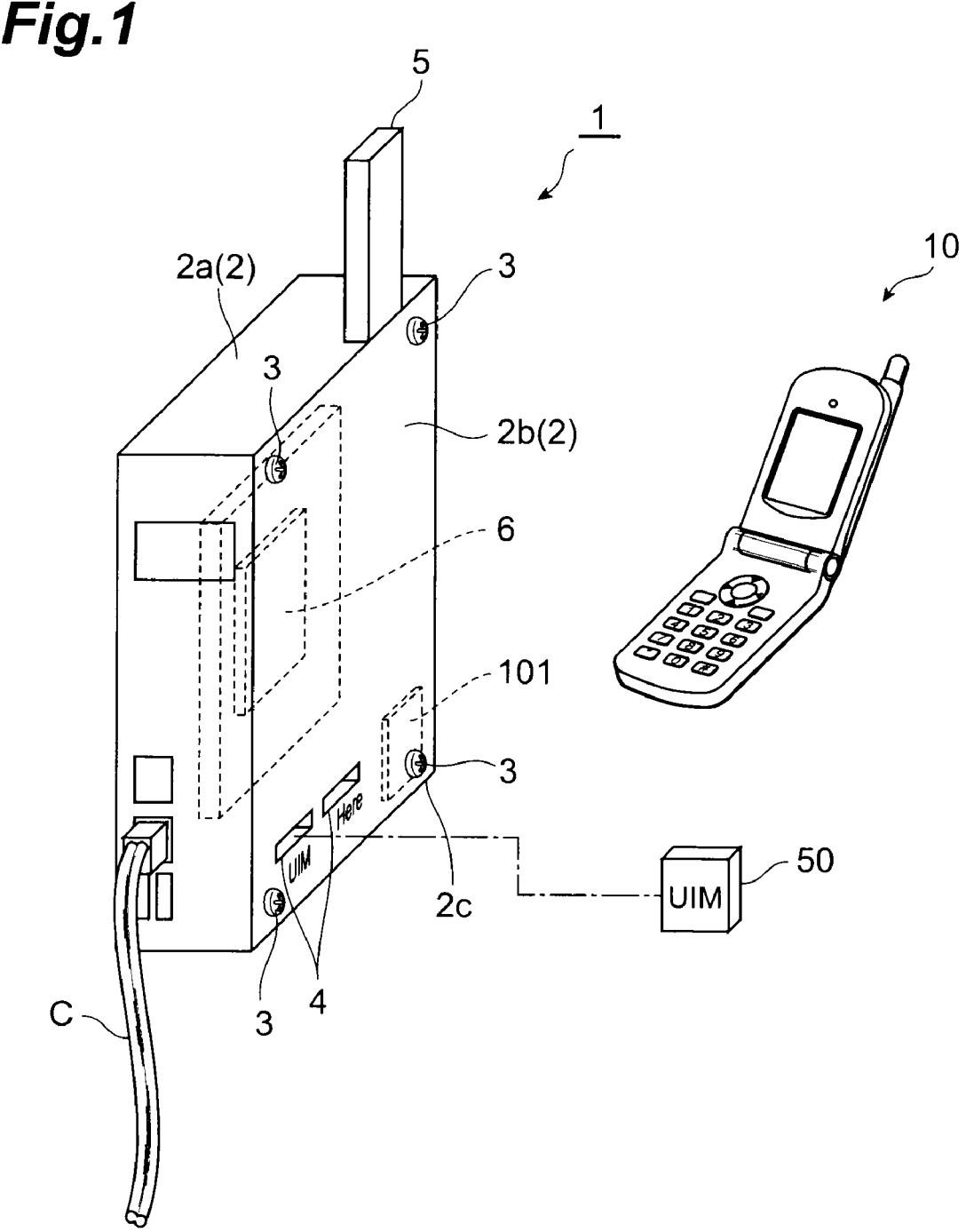
FIG. 1 is a perspective view showing an aspect of a mobile base station device of the invention.

1 Mobile base station device
2 Housing

6 Communication control module
7 Communication control program
20 Service management server
101 Opening detection portion
102 Opening information transmission portion
104 Program deletion portion
106 Mode switching request reception portion

BEST MODE FOR CARRYING OUT THE INVENTION

Below, preferred aspects of a mobile base station device of the invention are explained in detail, referring to the drawings.

Figure 2:
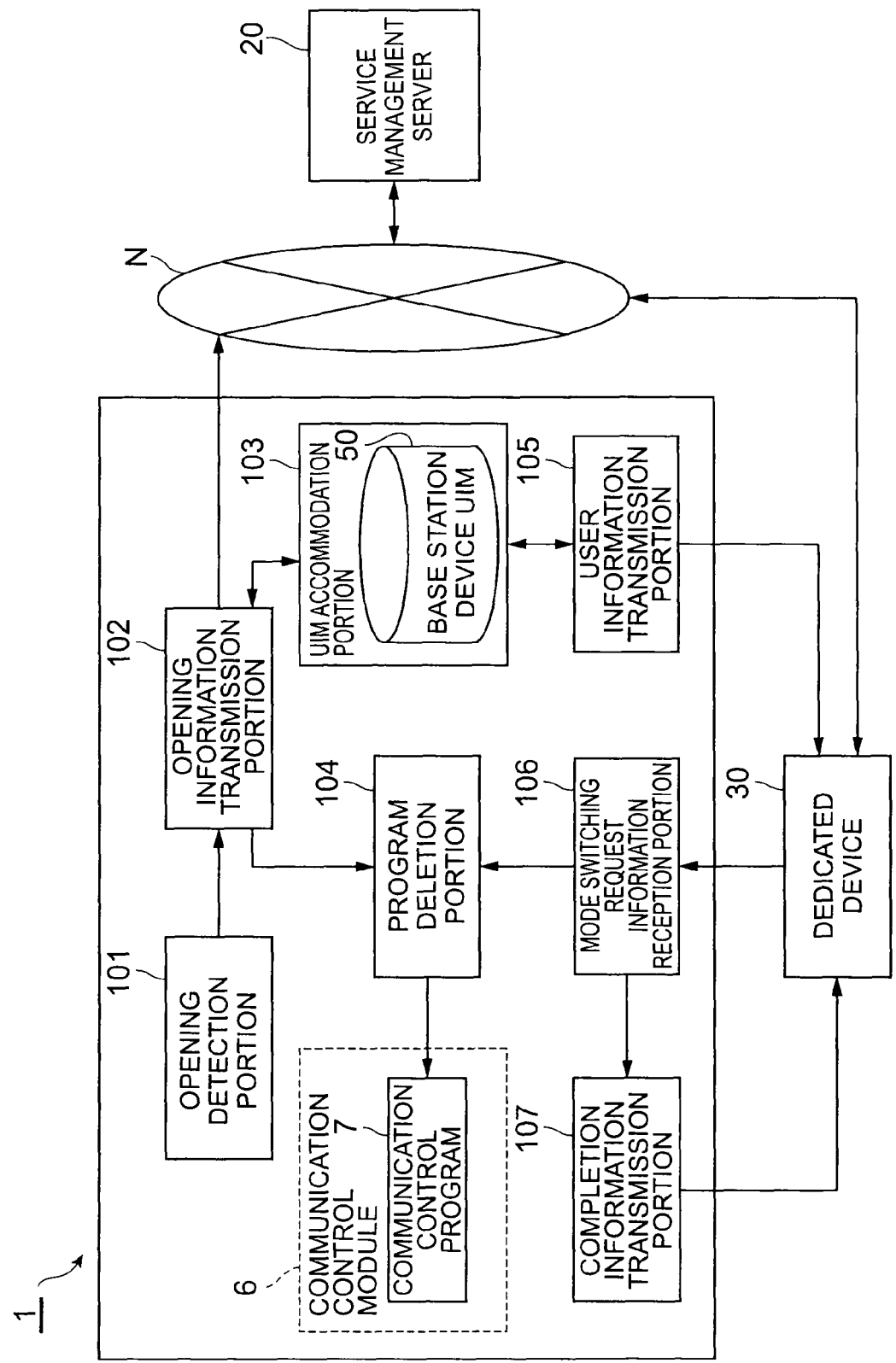
FIG. 2 shows functional component elements of the mobile base station device shown in FIG. 1.

FIG. 1 is a perspective view showing in summary a mobile base station device of the invention. FIG. 2 shows the configuration of the mobile base station device shown in FIG. 1. The mobile base station device 1 shown in FIG. 1 and FIG. 2 is primarily installed in homes, and is configured as a device which relays wireless communication data between a portable terminal 10 and a network N.

The mobile base station device 1 and network N are for example connected via a WAN cable C so as to enable data communication; the mobile base station device 1 and portable terminal 10 are configured so as to enable wireless data communication. The network N is connected to a service management server (the prescribed transmission destination) 20, managed by a communication enterprise which provides communication services for the portable terminal 10 by means of the mobile base station device 1. The mobile base station device 1 can be connected to a dedicated device 30 used in repair services of the device 1 via, for example, a USB cable or similar.

This mobile base station device 1 has a housing 2 of a size which takes convenience of installation into consideration (for example, desktop size) as shown in FIG. 1. The housing 2 is configured such that a side lid 2b is fitted into a rectangular parallelepiped-shaped main body 2a; the four corners of the side lid 2b are each firmly fixed with screws 3 to the main body 2a.

On a side face of the housing 2 are provided a plurality of UIM insertion openings 4, connected to a UIM accommodation portion 103 (see FIG. 2). A UIM (User Identified Module; not shown) for a portable terminal, and a UIM 50 for the base station device, can be inserted into the UIM insertion openings 4. In the upper face of the housing 2 is provided an antenna 5 to transmit and receive wireless signals. The area centered on the antenna 5 and with radius of 5 to 10 m is the range of communication with the portable terminal 10.

In the accommodating space within the housing 2 are accommodated a CPU (Central Processing Unit), memory or other storage device, display device, lithium battery or other reserve battery, and in addition a communication control module 6, which stores a communication control program 7 (see FIG. 2) to govern communication of the mobile base station device 1. Also, an opening detection portion 101 (described below) is provided on the rear side of one corner 2c of the side lid 2b in the housing 2.

Next, functional component elements of the mobile base station device 1 are explained.

As shown in FIG. 2, the mobile base station device 1 has an opening detection portion (opening detection means) 101, opening information transmission portion (information transmission means) 102, UIM accommodation portion 103, program deletion portion (program use-disabling means) 104, user information transmission portion 105, mode switching request information reception portion (switching request reception means) 106, and completion information transmission portion 107. Each of these elements can operate by means of the reserve battery even when the power supply to the mobile base station device 1 is turned off.

The opening detection portion 101 is a portion which detects opening of the side lid 2b of the housing 2. This opening detection portion 101 has a detection circuit (not shown), configured such that, for example, a circuit is opened when the corner portion 2c of the side lid 2b is separated from the main body 2a. When the current value of the detection circuit falls below a standard value, opening detection information, indicating that the side lid 2b of the housing 2 is opened, is output to the opening information transmission portion 102.

The opening information transmission portion 102 is a portion which notifies the service management server 20 of the fact that the side lid 2b of the housing 2 is opened. More specifically, upon receiving opening detection information from the opening detection portion 101, the opening information transmission portion 102 reads information from the base station device UIM 50 accommodated in the UIM accommodation portion 103.

FIG. 3 shows an example of information stored in the base station device UIM 50. In the example of FIG. 3, the base station ID "0000AA" for the device 1, the user ID (user-specific information) "0000BB", and time information "20XX/XX/XX" indicating the current time, are stored.

When the mobile base station device 1 is online, the opening information transmission portion 102 immediately transmits to the service management server 20 the opening detection information received from the opening detection portion 101, and the base station ID, user ID, and time information, read from the base station device UIM 50. And, when the mobile base station device 1 is offline, the opening information transmission portion 102 temporarily stores each of the above-described items of information, and when the mobile base station device 1 switches to online operation, transmits the items of information to the service management server 20. After transmission of the items of information, the opening information transmission portion 102 outputs to the program deletion portion 104 deletion execution instruction information, instructing execution of deletion of the communication control program 7 from the communication control module 6.

The program deletion portion 104 is a portion which executes deletion of the communication control program 7. Upon receiving deletion execution instruction information from the opening information transmission portion 102, the program deletion portion 104 executes deletion of the communication control program 7 stored in the communication control module 6. On the other hand, upon receiving mode switching request information from the mode switching request information reception portion 106, the program deletion portion 104 makes a transition to a maintenance mode. In this maintenance mode, even upon receiving deletion execution instruction information from the opening information transmission portion 102, the program deletion portion 104 does not execute deletion of the communication control program 7.

When the dedicated device 30 is connected to the mobile base station device 1, the user information transmission portion 105 reads the user ID from the base station device UIM 50, and transmits the user ID to the dedicated device 30.

The mode switching request information reception portion 106 is a portion which receives mode switching request information from the dedicated device 30 when the dedicated device 30 has completed user authentication based on the user ID. The mode switching request information reception portion 106 outputs the received mode switching request information to the program deletion portion 104, and in addition outputs completion information, indicating completion of mode switching, to the completion information transmission portion 107. The completion information transmission portion 107 transmits completion information received from the mode switching request information reception portion 106 to the dedicated device 30.

Next, operation of a mobile base station device 1 having the above-described configuration is explained.

Figure 4:
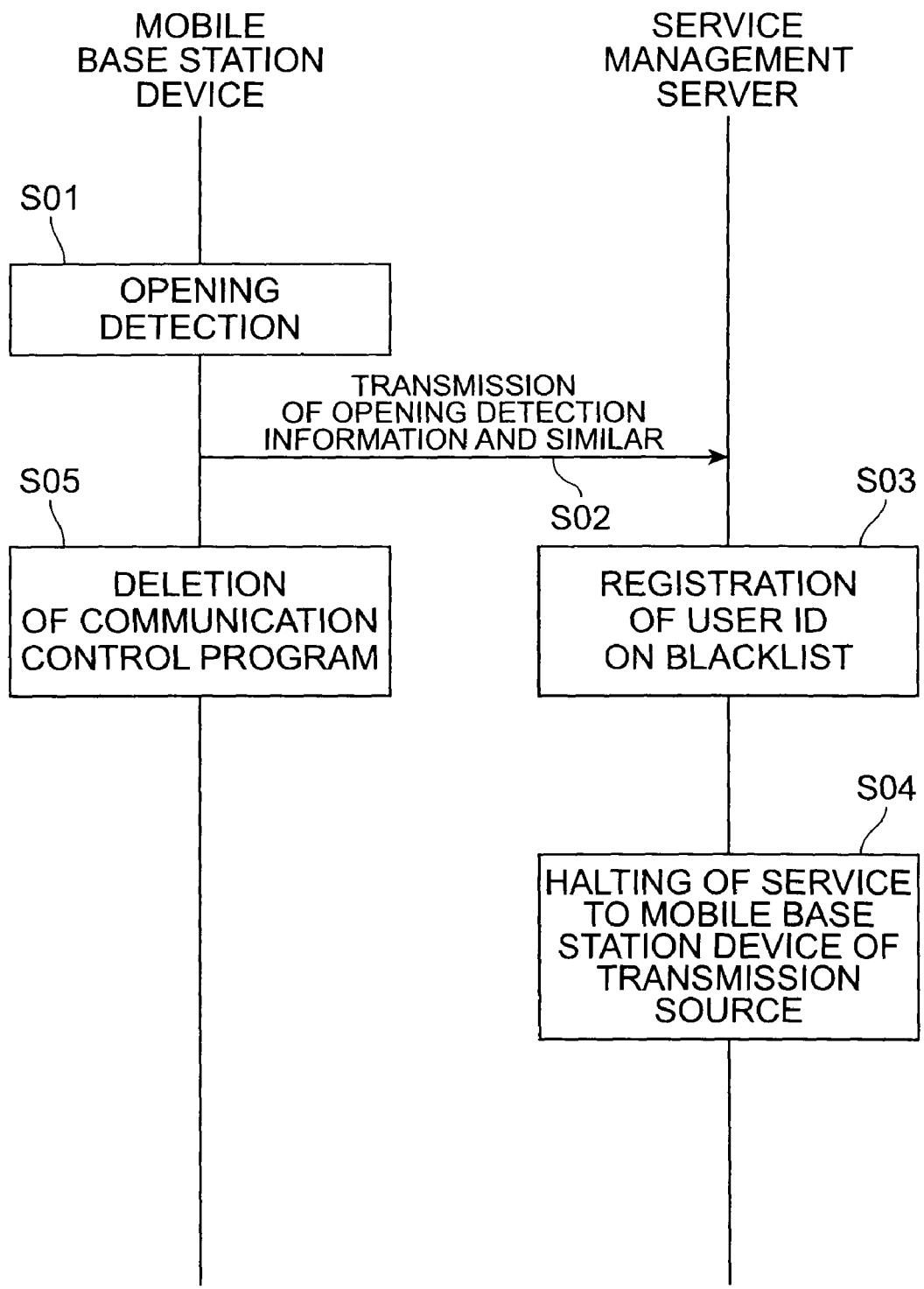
FIG. 4 is a sequence diagram showing operation when the housing is illicitly opened, in the mobile base station device shown in FIG. 1.

First, processing is explained, referring to the sequence diagram of FIG. 4, for a case in which the housing 2 of the mobile base station device 1 is opened illicitly. First, when a user or similar removes the screws 3, and opens the side lid 2b, the opening of the housing 2 is detected by the opening detection portion 101 (step S01). The opening detection information, base station ID, user ID, and time information are then sent from the mobile base station device 1 to the service management server 20, either immediately if the mobile base station device 1 is online, or else, if offline, immediately after switching to the online state (step S02).

Upon receiving the information items, the service management server 20 registers the received user ID on a blacklist (step S03), and performs processing to halt communication service for the mobile base station device 1 which is the transmission source, specified by the base station ID (step S04). On the other hand, at the mobile base station device 1, after transmission of the information items in step S02, deletion of the communication control program 7 is executed (step S05).

Figure 5:
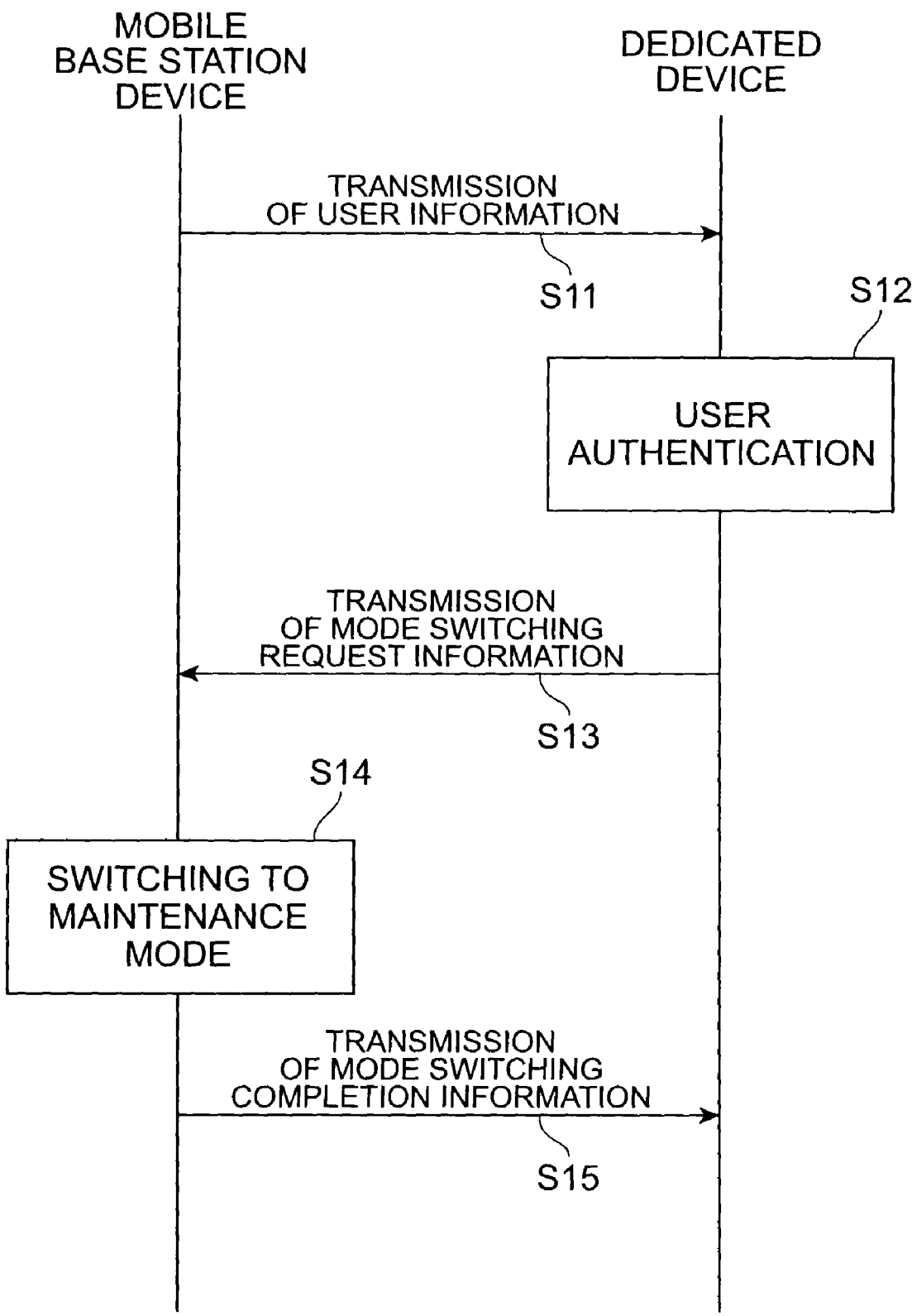
FIG. 5 is a sequence diagram showing operation in a maintenance mode of the mobile base station device shown in FIG. 1.

Next, processing in the maintenance mode is explained, referring to the sequence diagram shown in FIG. 5.

First, when the dedicated device 30 is connected to the mobile base station device 1, the user ID is transmitted from the mobile base station device 1 to the dedicated device 30 (step S11). The dedicated device 30 performs user authentication based on the received user ID (step S12), and also references the blacklist of the service management server 20 to check whether the user ID is registered on the blacklist.

After completion of user authentication, mode switching request information is transmitted from the dedicated device 30 to the mobile base station device 1 (step S13). Upon receiving the mode switching request information, the mobile base station device 1 switches to the maintenance mode (step S14), and transmits mode switching completion information to the dedicated device 30 (step S15). Thereafter, even when a technician performing repairs or similar opens the housing 2 of the mobile base station device 1, deletion of the communication control program 7 is not executed.

As explained above, when the housing 2 of the mobile base station device 1 is opened illicitly, the base station ID of the device 1, user ID, and similar are transmitted to a service management server 20 managed by a communication enterprise. By this means, the user attempting an illicit operation can be identified by the service management server 20, so that by for example registering the identified user on a blacklist, subsequent use by the user of the mobile base station device 1 can be prohibited. Further, in the mobile base station device 1 the user ID is transmitted to the service management server 20, and in addition the communication control program 7 is deleted from the communication control module 6, so that the interior of the housing 2 is rendered a "black box", and even when the housing 2 is opened illicitly, modification and illicit use of the communication control program can be deterred. As a result, adequate tamper resistance can be secured even when the housing 2 of the mobile base station device 1 is illicitly opened.

Also, upon receiving mode switching request information from the dedicated device 30, the mobile base station device 1 switches into the maintenance mode, and in this maintenance mode, even if opening of the housing 2 is detected by the opening detection portion 101, deletion of the communication control program 7 is not executed. In this case, or in cases in which repairs to the mobile base station device 1 are performed or similar defined cases, opening of the housing 2 is allowed.

This invention is not limited to the above aspect. For example, in the configuration of the opening detection portion 101, a touch sensor or similar which detects contact or non-contact between the side lid 2b and the main body 2a may be employed. Also, in the above aspect, use of the communication control program 7 is disabled through cooperative operation of the opening detection portion 101 and program deletion portion 104; however, the use-disabling means is not limited to such a configuration. For example, a substrate which deteriorates upon being exposed to light may be used as the substrate of the communication control module 6, and this communication control module 6 may be covered by a light-blocking film or similar. In this case, an opening detection portion 101 becomes unnecessary, and the configuration within the housing 2 can be simplified

INDUSTRIAL APPLICABILITY

By means of a mobile base station device of this invention, tamper resistance can be adequately secured even when the housing is opened illicitly.

The invention claimed is:

1. A mobile base station device, comprising—
a housing in which is housed a module configured to store a communication control program;
a detector configured to detect the opening of said housing;
a communication interface configured to transmit user-specific information for identifying a user of the device to a prescribed transmission destination when said Housing is opened;
a processor configured to, when the opening of the housing is detected by said detector, place said communication control program in a use-disabled state by executing deletion of said communication control program when said user-specific information is transmitted to said prescribed transmission destination by said communication interface;
a mode-switching request information receiving section configured to receive mode switching request information to request switching of said processor to a maintenance mode, and when said mode switching request information receiving section receives said mode switching request information, even when opening of said housing is detected by said detector, said processor does not execute deletion of said communication control program.

* * * * *